Oct. 2, 1951 C. A. McKEE 2,570,141
IMPLEMENT HOLDER
Filed July 5, 1947
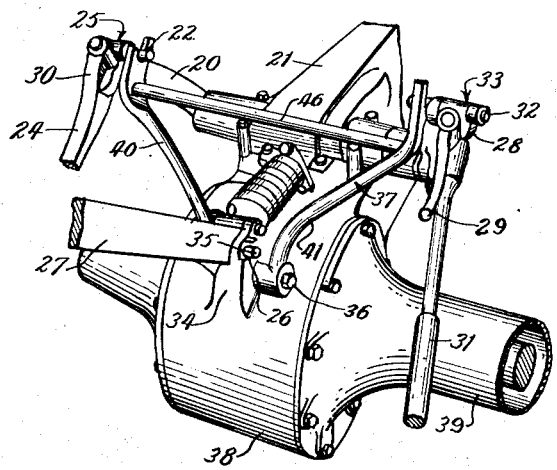
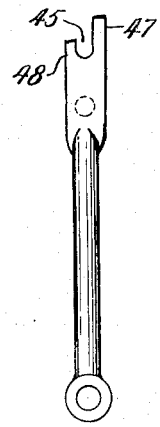
Inventor.
Clare A. McKee.
By:- Mann and Brown
Attys.

Patented Oct. 2, 1951

2,570,141

UNITED STATES PATENT OFFICE 2,570,141

IMPLEMENT HOLDER

Clare A. McKee, Highland Park, Ill.

Application July 5, 1947, Serial No. 759,122

2 Claims. (Cl. 97—50)

My invention pertains to tractor draft mechanism in general and is directed particularly to the provision of means for supporting in a raised position various implements mounted on a tractor.

The primary object of my invention is to provide an inexpensive, durable, efficient and easily operated support for tractor implements which may be permanently secured to a tractor or the like and which is adapted to maintain implements pivotally supported on a tractor or the like in raised position even in the event of failure of the hydraulic lifting mechanism of the tractor.

The necessity of such a device is particularly apparent when the size and weight of various recently developed tractor supported appliances is considered. Earth augers, for example supported and driven by tractors are now in relatively wide spread use and weigh up to approximately 2,000 pounds. Damage to the auger and injury to workmen has occurred particularly on cold mornings when the hydraulic lifting mechanism of the tractor to which such implements are attached has failed to function properly, this failure sometimes occurring when the tractor is moving. Supporting the auger or other implement by shoring or blocks while repairs are being made has also proven dangerous and unsatisfactory, and does not in any manner prevent a reoccurrence of damage caused by dropping of the implement while the tractor is in motion.

My device, which in its preferred form is essentially a yoke pivoted to the tractor and having a notched arm which engages the lifting arm of the tractor, obviates these difficulties and provides an easily disengaged positive implement support useable while the tractor is traveling or motionless.

The foregoing as well as other objects and advantages will become apparent from the following specification and from the accompanying drawings in which:

Figure 1 is a perspective view of a preferred embodiment of my implement support; and Figure 2 is a side view of the implement support illustrated in Figure 1.

Although my implement support is useable with a great variety of tractors I have chosen to illustrate the adoption of my device to a tractor having a lifting arm 20 pivoted to a tractor frame generally indicated at 21, and moveable in an arc by a hydraulic mechanism driven from the tractor. The upper end of the arm 20 is secured to a pin type universal joint 25, which supports a second arm 24, the latter serving to raise and lower the implement about a pivot 26 on the frame of the tractor. The universal joint 25 includes a cross pin 22 which extends laterally in an inward direction beyond the universal joint 25. A tilting arm 28 is also conventionally applied to tractors and may be controlled either hydraulically or manually, as by a handle 29, a rigid member 31 being employed to connect the implement to the tilting arm 28 through a universal joint 33. The joint 33 is provided with a laterally extending pin 32 similar to the pin 22 described in connection with the lifting arm 20.

The pivot 26 normally comprises a boss 34 formed integrally with the frame or the differential of the tractor and slotted centrally to receive a member 27 which is connected to the implement. A pin 35 extends through the boss 34 and the member 27, forming the pivot 26.

As previously mentioned the lifting arm 20 exerts a powerful lifting force, sufficient to elevate heavy implements, but the hydraulic lifting mechanism is subject to failure for various causes, particularly when the ambient temperature is low. I therefore provide a support yoke generally designated 37 pivotally secured at its neck to the frame 21 or to a differential housing 38 from which axle housings 39 extend.

The yoke 37 comprises a pair of arms 40 and 41 which diverge upwardly from a pivot 36 to a level adjacent the highest position of the cross pins 22 and 32. The lower ends of the arms 40 and 41 are suitably shaped and bored to straddle the boss 34 and receive a pivot pin 36. The upper ends of the arms 40 and 41 are preferably flattened and are notched at their upper ends, as at 45, to receive the laterally extending pins 32 and 22. It is understood of course, that pins or other supports may be secured directly to the lifting arm 20 and to the tilting arm 28 or other lifting members as by welding or other means, the sole purpose of these pins being to provide a laterally extending member rigid with the arms 20 and 28, which may be readily engaged by the arms 40 and 41. A reinforcing bar 46 extends transversely between the arms 40 and 41 adjacent the upper ends to prevent spreading of the arms under load.

The notches 45 formed in the upper ends of the bars 40 and 41 are preferably defined by a long side 47 and a short side 48. The effective length of the arms 40 and 41 is such that when pins 22 and 32 have been raised to their highest position by the lifting arm 20, the yoke 37 may be swung from a lowered position, in which it rests against the frame 21, rearwardly into a raised or active position, the long sides 47 intercepting the pins 22 and 32. The pins may then be dropped into the notches 45 by lowering the arms 20 and 28. Obviously the effective distance from pivot 36 to the end of the short side 48 must be less than the maximum distance from the pivot 36 to the pins 22 and 32.

The operation of my device will be readily apparent from the foregoing description. When the yoke 37 is not in use it is permitted to swing forwardly about the pivot pin 36 and lie in generally horizontal position on the frame 21 of the tractor. When it is desired to employ my support yoke, the lifting arm 20 is employed to raise the implement to its highest position. The operator then moves the yoke rearwardly until the long side 47 of the notch 45 engages pins 22 and 32. While holding the yoke in this position the lifting arm 20 is lowered to seat the pins 22 and 32 in the notches 45. The arms 40 and 41 will then transmit all the weight of the implement directly through the pivot pin 36 to the differential housing 38, the reinforcing bar 46 preventing separation of the arms 40 and 41 under load. When the yoke is in supporting position it cannot slip or become accidentally disengaged since the pins 22 and 32 must be raised to disengage the yoke. Repairs may therefore be safely made to the implement while the support is being employed or the tractor may be driven over rough ground without danger of the implement accidentally being dislodged or falling.

It is not essential that pins such as the pins 32 and 22 be actually employed since the axes of the notches 45 may be parallel instead of transverse to the arms 20 and 28. If parallel, the notches 45 may engage the lifting arm 20 and the tilting arm 28 directly, coming to rest at the universal joints 25 and 33. This, however, is a less positive means of support and does not constitute a preferred embodiment.

In compliance with RS-4888 I have in the foregoing specification described in detail various embodiments of my invention but since these represent only a few of the various forms which my device may take I do not wish to be limited specifically to the details disclosed herein except insofar as defined by the appended claims.

I claim:

1. An implement holder for use with tractors and other vehicles, having a frame and an implement movably supported on said frame and moved to and from operating position by spaced parallel arms pivotally mounted on said frame, said implement holder comprising a V-shaped yoke having its lower end pivotally carried on the frame at a point spaced from the pivot for said arms, the upper end of said yoke having portions adapted to engage said spaced implement-lifting arms to limit downward travel thereof and thereby to support the implement in raised position independently of power applied to the implement-lifting arms, said yoke being rotatable about its pivot to an inoperative position, whereby the implement-lifting arms may move the implement without interference from said yoke.

2. An implement holder for use with tractors and other vehicles, having a frame and an implement movably supported on said frame and moved to and from operating position by spaced parallel arms pivotally mounted on said frame, said implement holder comprising a V-shaped yoke pivoted at its lower end to said frame at a point spaced from the pivot for the implement-lifting arms, said yoke comprising spaced members connected together adjacent their upper ends and having slotted portions adapted to engage laterally extending protuberances on the implement-lifting arms to thereby limit downward travel of said arms, said yoke being disengageable from said protuberances and movable to a position which permits unimpeded movement of the implement-lifting arms, whereby the implement may be moved throughout its operating range without interference from said yoke.

CLARE A. McKEE.

REFERENCES CITED

The following references are of record in the file of this patent:

UNITED STATES PATENTS

| Number | Name | Date |
| --- | --- | --- |
| 1,089,213 | Hallbauer | Mar. 3, 1914 |
| 2,058,964 | Dufour | Oct. 27, 1936 |
| 2,222,115 | Mott | Nov. 19, 1940 |
| 2,324,840 | Hipple | July 20, 1943 |
| 2,440,422 | Westmoreland | Apr. 27, 1948 |

FOREIGN PATENTS

| Number | Country | Date |
| --- | --- | --- |
| 30,088 | Sweden | May 19, 1909 |